United States Patent [19]
Balkanli

[11] 4,195,349
[45] Mar. 25, 1980

[54] SELF CALIBRATING ENVIRONMENTAL CONDITION SENSING AND RECORDING APPARATUS

[75] Inventor: Hayati Balkanli, Houston, Tex.

[73] Assignee: Lynes, Inc., Houston, Tex.

[21] Appl. No.: 872,530

[22] Filed: Jan. 26, 1978

[51] Int. Cl.² .................. E21B 47/06; G01L 7/04
[52] U.S. Cl. .................. 364/571; 364/422; 235/92 MT; 73/152; 73/154; 73/345
[58] Field of Search .............. 73/1 F, 152, 151, 154, 73/345; 364/571, 418, 422, 510, 900; 235/92 MT; 340/347 AD, 347 CC

[56] References Cited
U.S. PATENT DOCUMENTS

| 2,922,990 | 1/1960 | Anderson | 364/900 |
|---|---|---|---|
| 3,807,860 | 4/1974 | Brainard | 364/571 |
| 4,031,365 | 6/1977 | Raggiotti et al. | 235/92 MT |
| 4,033,186 | 7/1977 | Bresie | 73/154 |
| 4,064,396 | 12/1977 | Panarello | 340/347 |

Primary Examiner—Malcolm A. Morrison
Assistant Examiner—Gary Chin
Attorney, Agent, or Firm—William C. Norvell, Jr.

[57] ABSTRACT

Apparatus for measuring and recording environmental conditions in a deep bore hole using a down hole gauge including pressure and temperature sensors and data processing elements is disclosed. A pressure transducer such as a Bourdon tube is provided for measuring the down hole pressure. An encoder coupled to the pressure transducer produces a plurality of data bits defining a coded word representative of the down hole pressure. A temperature transducer is also provided for measuring the down hole temperature. An oscillator is coupled to the temperature transducer for providing a timing signal having a frequency which is proportional to the down hole temperature. Serial shift registers are provided for recording data bits in separate groups of bits defining data words which are representative of the down hole pressure and temperature conditions. Temperature information is integrated into each data word by sequentially gating the pressure data bits into a serial shift register at a rate which is proportional to the frequency of the temperature-dependent timing signal.

20 Claims, 7 Drawing Figures

SELF CALIBRATING ENVIRONMENTAL CONDITION SENSING AND RECORDING APPARATUS

BACKGROUND OF THE INVENTION

1. Field of the Invention

The invention is related generally to apparatus for measuring and recording environmental conditions, and in particular it concerns electrical logging apparatus for use in bore holes in the earth for sensing, digitizing and storing values of down hole pressure and temperature conditions.

2. Description of the Prior Art

It is necessary to measure and record environmental conditions in a number of important activities conducted both above and below ground. In the petroleum production industry, for example, the measurement and recording of down hole pressure and temperature conditions is of great importance in the location of petroleum bearing strata. The presence and thickness of oil and water layers below the surface of the earth can be determined by the pressure and temperature gradient existing between different depths along the bore hole. The time rate of decrease in pressure at the bottom of the well during fluid production, and the rate of recovery in pressure when production is terminated are indicative of the geological characteristics of the oil bearing strata. The value of this environmental information is dependent upon the accuracy of the sensors and the fidelity of the data storage apparatus in which the data are recorded.

The down hole pressure and temperature measuring devices known in the art have generally relied upon electro-mechanical analog systems to record the desired data. The pressure sensor most commonly used in the mechanical analog system is a high torque Bourdon tube by means of which pressure is sensed via the expansion and contraction of a movable element of the tube. A stylus attached to the movable element of the tube is used to record the information on a chart which is rotated by a mechanical cylinder and clock mechanism. For temperature measurement, a bimetallic helix is commonly used as a temperature sensor in the same way that a Bourdon tube is used for pressure measurements. The paper which contains the pressure or temperature information constitutes a permanent analog memory. Therefore, uniform chart motion and accurate stylus response are essential for accuracy. The information stored in the permanent analog memory is translated into digital form after the apparatus is retrieved from the bore hole.

Another analog measuring technique known in the art is by the measurement of current conducted through a length of electrical wire from a measuring device disposed at the proper down hole depth to a remote indicator or recorder which monitors the measurement. The accuracy of such a measurement is dependent in part on the resistance of the length of the wire which in turn is dependent upon the total length of the wire from the sensing device to the indicator. The total length of the wire may vary from well to well due to the depth of the bore hole and the distance of the indicator or recorder from the hole. Furthermore, the resistance of the electrical wire may vary due to temperature variations in the hole.

Because of the foregoing limitations associated with analog measuring and recording techniques, improved measuring and recording apparatus utilizing digital storage techniques have been developed. An example of apparatus for down hole pressure and temperature measurement in which a random access digital data memory is used to store pressure and temperature data is disclosed in U.S. Pat. No. 4,033,186. A further advance in improving the accuracy of the sensing apparatus is disclosed in U.S. Pat. No. 3,968,691, entitled "Environmental Condition Sensing Apparatus", by Hayati Balkanli, in which radiant energy sources and sensors, as well as a small coded wheel are used in place of certain analog elements, which is believed to reduce the size of the apparatus while increasing its accuracy.

Although the prior art approaches represent significant improvements in the measuring and recording of environmental condition data, a significant error may be introduced by the pressure and temperature anomalies associated with the transducers and encoding equipment commonly utilized in these systems. Experience has shown that environmental condition sensors, and in particular pressure transducers are subject to certain pressure responsive anomalies which may distort the actual value of the pressure condition being sensed, and also that they may be subject to a temperature sensitive anomaly which may also distort the value of the pressure condition being sensed. These anomalies, if not compensated, may introduce significant error into the data gathered by the system.

Therefore, it is an object of this invention to provide an environmental condition sensing and recording apparatus which will sense down hole pressure and temperature, or any two environmental conditions, digitize the information precisely and record the information in a digital data storage unit.

It is a further object of this invention to provide an environmental condition sensing apparatus utilizing sensors and data processing elements which include calibration circuitry means for removing or compensating certain environmental condition sensitive anomalies to which the sensors are responsive.

SUMMARY OF THE INVENTION

The present invention provides a down hole gauge apparatus for measuring and recording environmental conditions such as pressure and temperature, which features sub-surface data processing and digital storage of data. The instrument is self-contained, self-powered, and includes sensors which are sensitive to the environmental conditions in a deep bore hole and which provide electrical signals which vary according to the variation of the values of the environmental conditions at various depths.

In its broadest aspects, the invention includes means for sensing a first environmental condition and for providing a plurality of data bits defining a coded word which is representative of the first environmental condition. Means are also provided for sensing a second environmental condition including means for providing a timing signal having a frequency indicative of the level of the second environmental condition. Data storage means are provided for recording data bits and separate groups of bits defining data words which are representative of the first and second environmental conditions, respectively. Control circuitry is logically coupled to the first and second environmental conditions sensing means for sequentially gating the first environmental condition data bits into the data storage means at a rate which is proportional to the frequency of the timing signal. In this manner, the word which defines the first environmental condition also includes information from which data bits representative of the second environmental condition may be derived.

Derivation of the second environmental condition data is carried out by means of a clock signal for generating clock pulses at a fixed frequency, and a counting circuit coupled to the clock signal generator for producing a plurality of data bits representative of its count during a counting interval. The control circuitry is logically coupled to the clock signal generator, the counting circuit and the data storage means for enabling the counting circuit simultaneously with the gating of the last data bit of the first environmental condition data word, for disabling the counting circuit in response to the generation by the clock signal generator of a predetermined number of clock pulses during a counting interval beginning with the gating of the first data bit of the first environmental condition data word and terminating in response to the completion of the predetermined clock pulse count. The plurality of data bits representative of the number of clock pulses counted by the counting circuit during the counting interval are representative of the second environmental condition and are gated into the data storage means in response to the occurrence of the predetermined count.

According to another important aspect of the invention, the apparatus described above includes a transducer for sensing an environmental condition which is characterized by an anomaly which is a predictable function of the environmental condition to which it is responsive. An encoder is coupled to the transducer for producing a digital data word having a plurality of data bits representative of the environmental condition sensed by the transducer. The anomaly is compensated by non-volatile digital data storage means such as a read only memory having calibration data bits permanently stored in memory cells for compensating the effects of the anomaly. The calibration data bits are derived from the transducer and are permanently stored in memory locations which correspond to selected pluralities of bits of the environmental condition data word produced by the encoder. The non-volatile digital data storage means produces a number of calibration data bits which logically corresponds to the address defined by the uncalibrated data bits.

According to yet another important aspect of the invention, the environmental sensing and recording apparatus as described above includes a transducer for sensing a first environmental condition, such as pressure, and an encoder coupled to the transducer for producing a digital data word having a plurality of data bits representative of the first environmental condition sensed by the transducer, wherein the transducer is characterized by an anomaly which is a predictable function of a second environmental condition, such as temperature. The effect of the anomaly is compensated by the combination with the apparatus of a second transducer for sensing the second environmental condition having an output signal which is proportional to the value of the second environmental condition, an oscillator coupled to the second transducer for providing a timing signal having a frequency which is proportional to the value of the second environmental condition, and calibration function means coupled to the oscillator for generating a plurality of data bits defining a digital data calibration word which corresponds in compensating relation with the value of the second environmental condition anomaly. An adder logic unit is provided for logically adding the digital data calibration word to the uncalibrated first environmental condition data word. The calibrated first environmental condition data bits are the logical sums of the uncalibrated first environmental condition data bits and the corresponding second environmental condition calibration data bits.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

DESCRIPTION OF THE PREFERRED EMBODIMENT

Figure 1:
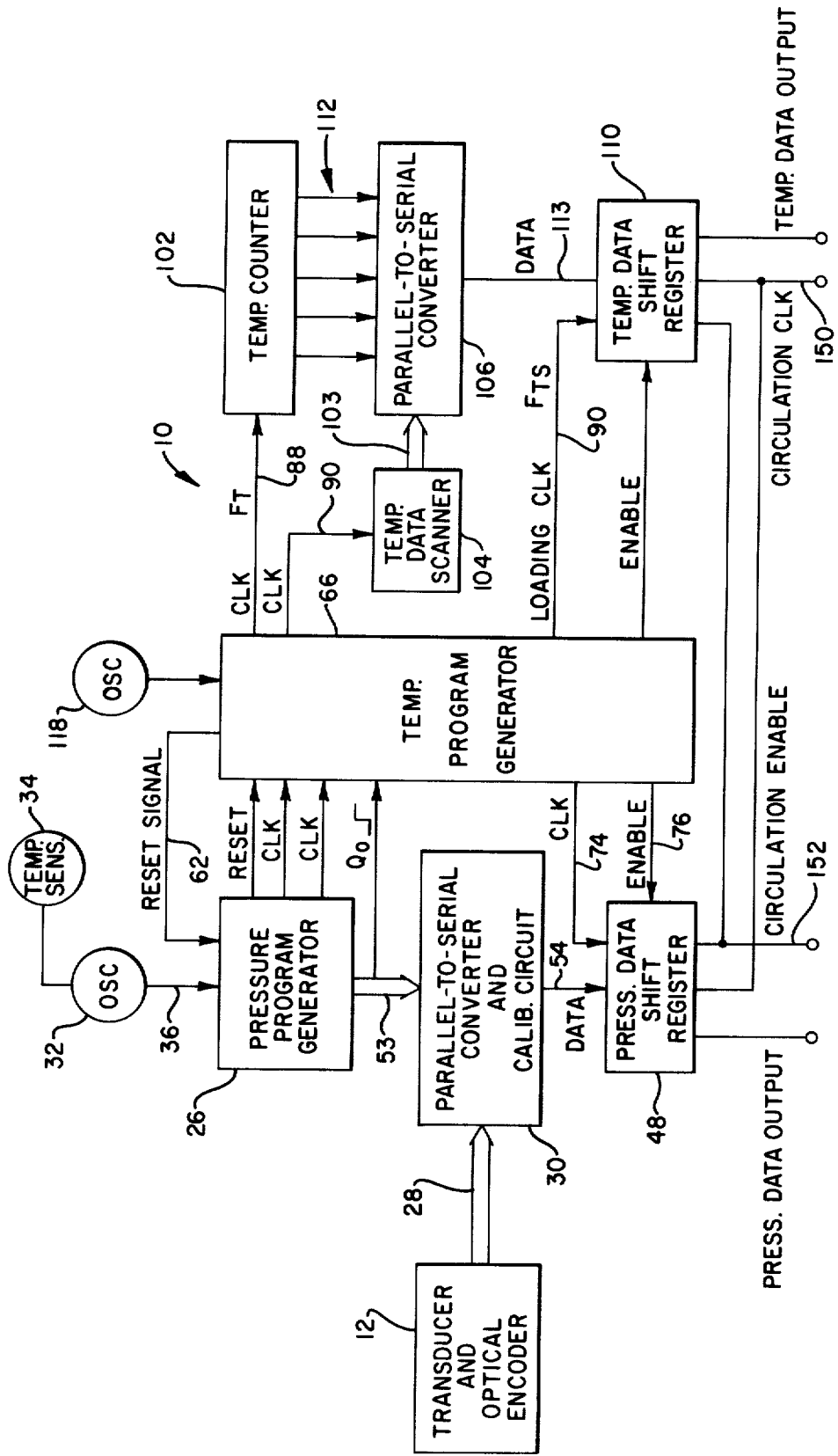
FIG. 1 is a simplified circuit block diagram of the self-calibrating environmental condition measuring and recording apparatus of the invention.

In the description which follows, like parts are marked throughout the specification and drawing with the same reference numerals respectively.

Referring now to the drawing, and in particular to FIG. 1, apparatus for measuring and recording environmental conditions including sensors and data processing elements is indicated generally by the reference numeral 10. The measuring and recording apparatus 10 includes a transducer and optical encoder combination 12 which is preferably constructed according to the disclosure of U.S. Pat. No. 3,968,691 entitled "Environmental Condition Sensing Apparatus" by Hayati Balkanli, which is hereby incorporated by reference. According to that disclosure, a Bourdon tube includes a movable element which moves in response to changes in pressure and drives a coded wheel which rotates an amount determined by the sensed pressure. The coded wheel has a number of transparent and opaque concentric bands thereon which form a gray code pattern indicative of a selected range of pressures. A plurality of radiant energy transmitters are radially positioned on one side of the wheel in optical alignment with each of the respective bands. A plurality of radiant energy sensors are positioned and aligned in like manner on the other side of the wheel for sensing the passing or blocking of the radiant energy by the respective bands formed on the wheel. Field experience has shown that the Bourdon tube transducer is subject to an inherent pressure anomaly, and an inherent temperature anomaly which must be corrected or compensated to improve the accuracy of the measuring apparatus.

Figure 2:
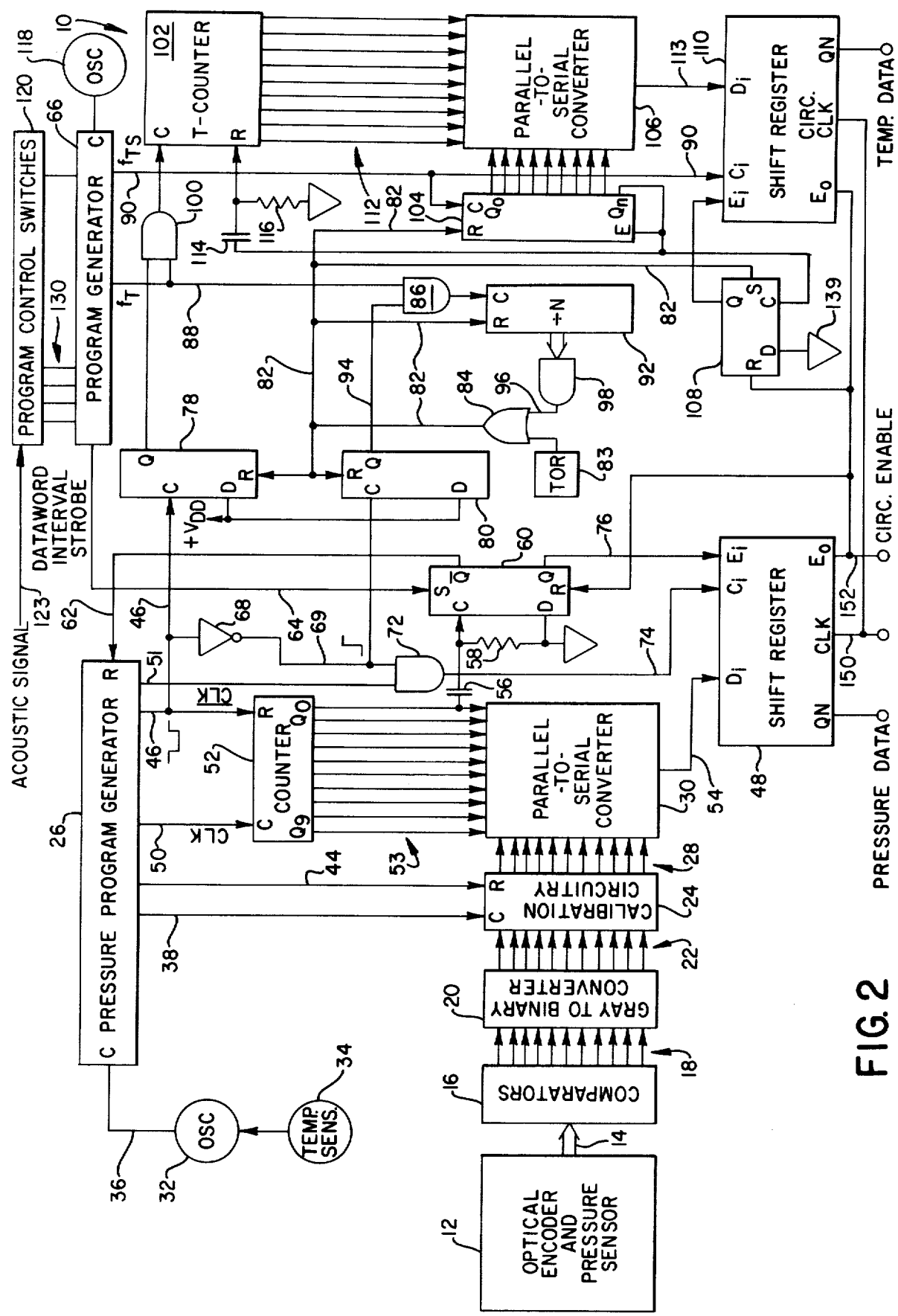
FIG. 2 is a detailed circuit block diagram of the circuit shown in FIG. 1.

Referring now to FIGS. 1 and 2, the transducer and optical encoder 12 provides a plurality of data bits defining a coded word, each bit of the coded word having at least two distinct code states, the permutation sequence of the code states of the bits in the word being representative of the level of the pressure sensed by the transducer. The information output appears in parallel analog format on data conductors 14. The outputs of the photo transistors in the optical encoder which detect the logic states are in analog form and must be decoded to determine the logic state of each signal. A precision set of comparators 16 are coupled to the data conductors 14 to determine the logic state of each bit of the pressure data word. According to this arrangement, the magnitude of the analog signal is compared with the magnitude of a reference signal with analog signals having a magnitude of less than fifty percent of the reference signal indicating the logic "zero" state of a data bit and from fifty percent to one hundred percent magnitude indicating the logic "one" state of a data bit. The coded and digitized data is conducted through comparator output conductors 18 and are applied to the input of a Gray-to-binary converter 20 thereby transforming the parallel Gray coded data word into a parallel data word having straight binary form. The advantage of this transformation is that it permits the size and complexity of the pressure and temperature calibration circuitry to be minimized. The straight binary data pressure word is applied through data output conductors 22 to calibration circuitry 24 for compensating the effects of pressure and temperature anomalies associated with the pressure sensor and optical encoder elements.

Figure 5:
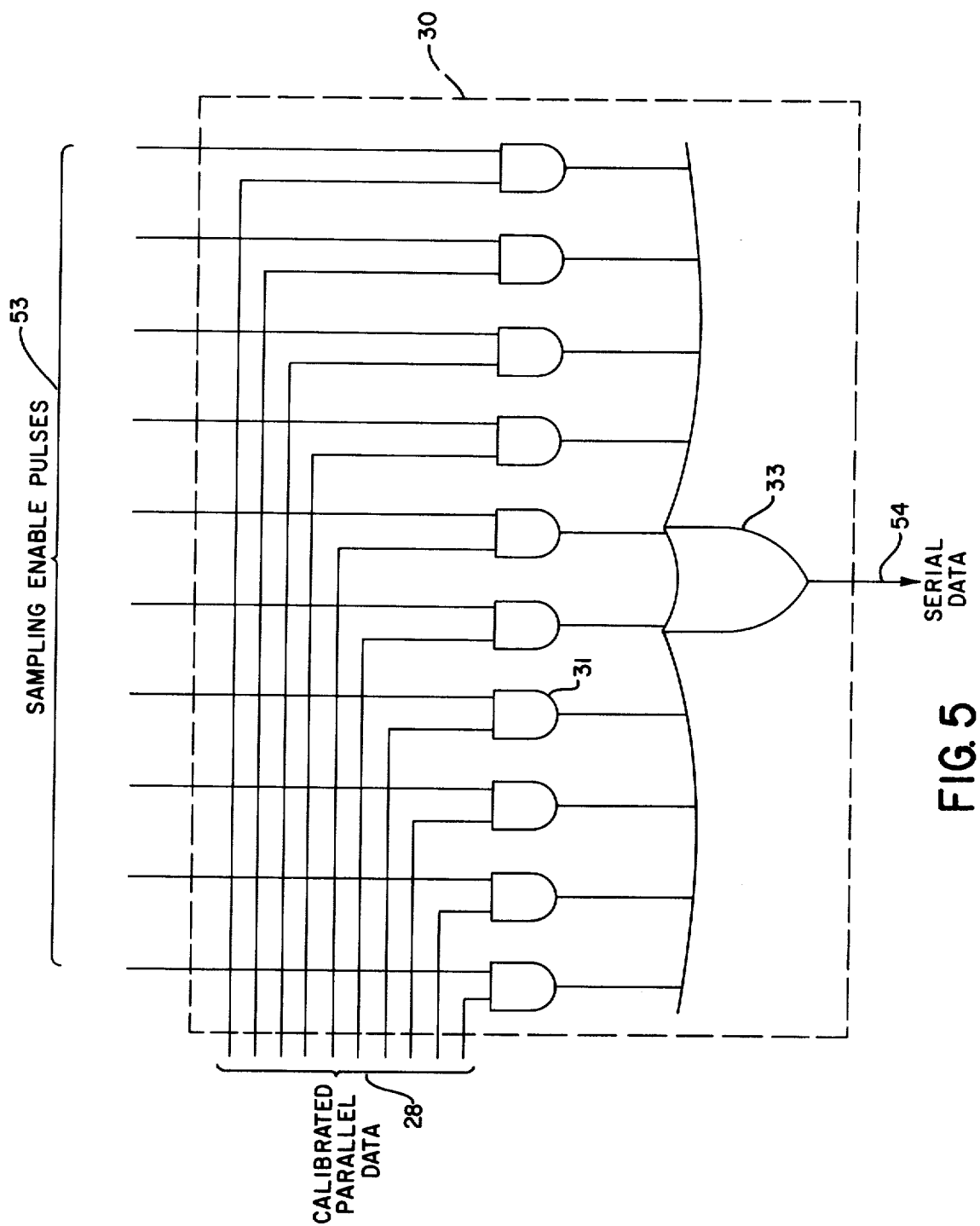
FIG. 5 is a block diagram of a parallel to serial data converting circuit.

According to the physical characteristics of the material from which a sensor is constructed, certain anomalies can be observed in the output signal of that sensor, and are predictable over a given output range. These anomalies can be corrected at any point of data acquisition and processing. The anomalies typically do not exceed a few percent of the full range in magnitude. In this preferred embodiment, the calibration circuit 24 removes or corrects the anomalies which appear in the lower significant bits of the uncalibrated data word by a controlling function which is supplied by a pressure program generator 26 with the corrected pressure data word being applied through conductors 28 to a parallel-to-serial data converter 30. The parallel-to-serial data converter 30 may be constructed according to conventional techniques with a number of AND-gates 31 and OR-gates 33 as shown in FIG. 5.

The pressure program generator 26 is controlled by a temperature responsive oscillator 32 which is driven by a temperature transducer 34. The temperature responsive oscillator 32 produces a clock timing signal 36 having a frequency indicative of the level of the temperature sensed by the transducer 34. In response to the temperature clock timing signal 36, the pressure program generator 26 generates a temperature calibration clock signal having a frequency which is proportional to the level of temperature sensed by the transducer 34.

Figure 4:
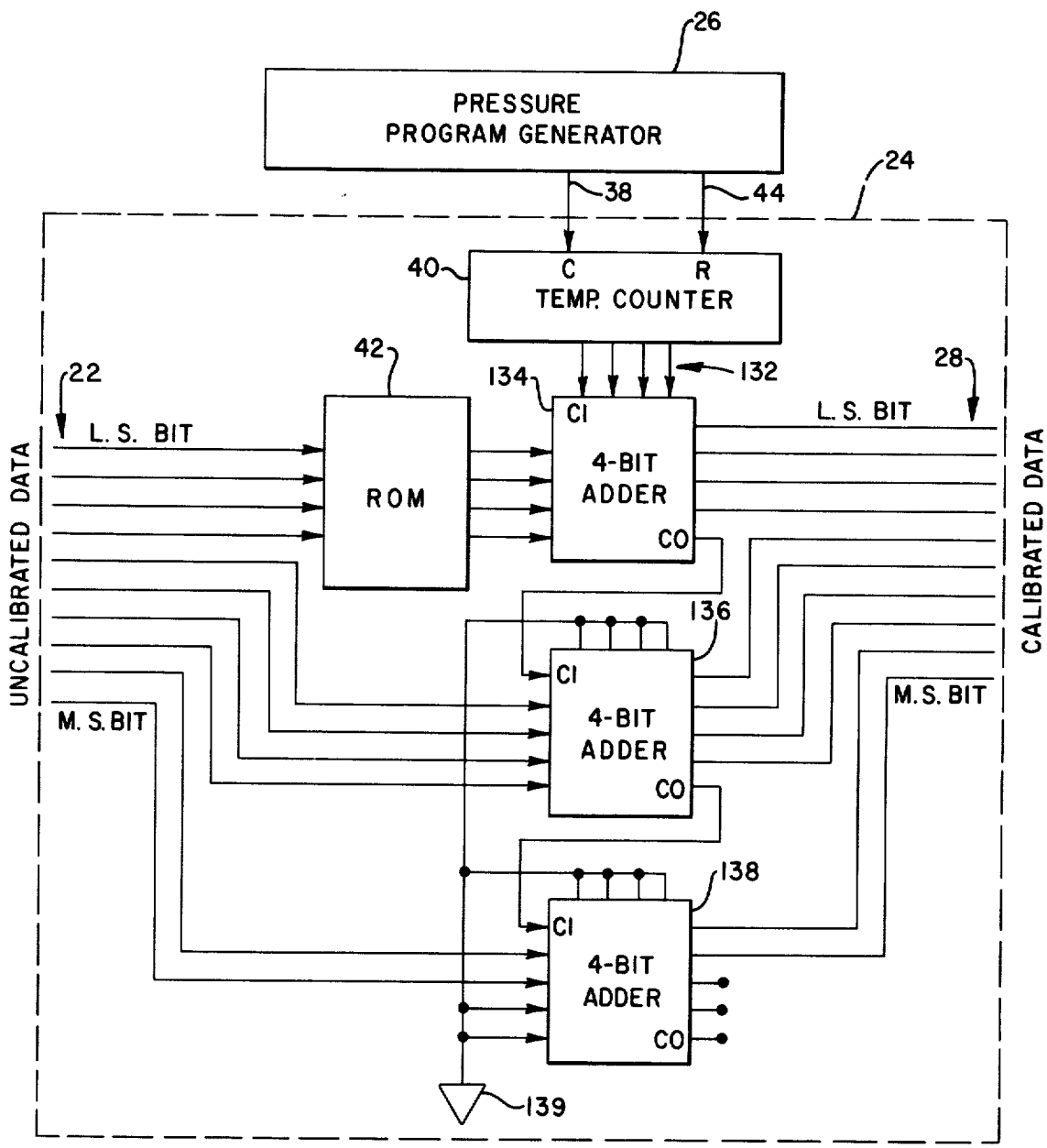
FIG. 4 is a block diagram of a circuit for compensating the effects of pressure and temperature anomalies.

Referring now to FIG. 4, the calibration circuitry 34 includes a temperature counter and calibration function generator 40 which produces a plurality of data bits defining a digital data calibration word which corresponds in compensating relation with the value of the temperature anomaly for the temperature sensed by the temperature transducer 34. The pressure and temperature calibration circuitry 24 includes the temperature counter and calibration function generator 40 and a non-volatile digital data storage memory 42 which is preferably a read only memory (ROM) having an array of memory cells for storing calibration data bits corresponding to compensating relation with the value of the pressure anomaly for the pressure sensed by the transducer 12. This pressure calibration data is unique for each particular transducer and must be derived and stored in the read only memory 42 prior to operational use.

The pressure program generator also supplies a reset signal 44 for controlling the temperature counter 40, a reset signal 46 for controlling the loading of data in a pressure shift register 48 and clock signals 50, 51 for controlling the gating of calibrated data bits in the parallel-to-serial data converter 30. The clock signal 50 is applied to a counter and gating generator 52 which includes a decoder circuit (not shown) having a number of inverters and gates connected in a conventional manner for providing a sequence of gating signals 53 as illustrated by the sampling enable pulses in FIG. 3 of the drawing.

Figure 3:
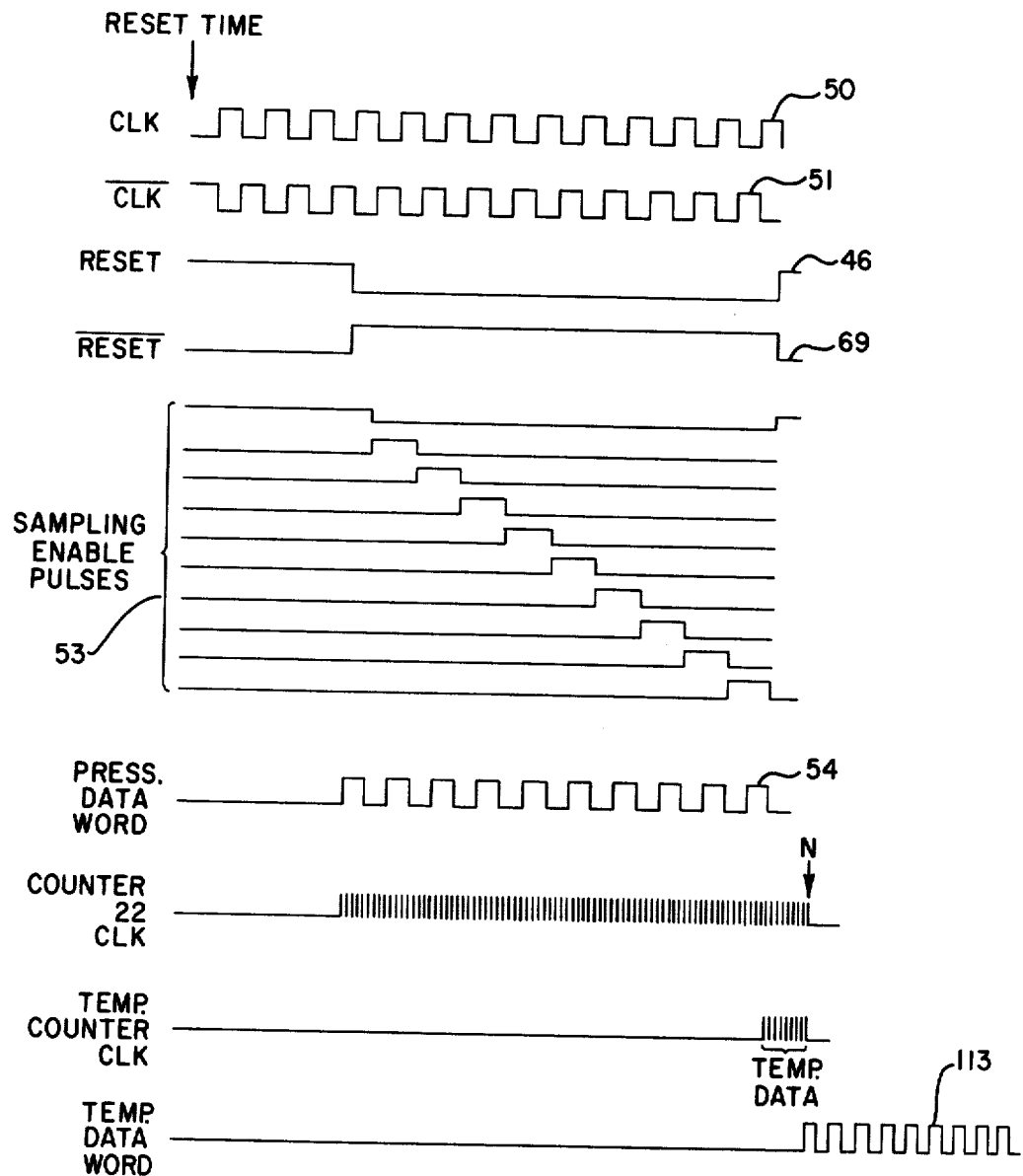
FIG. 3 is a graphical representation of the logical relationship between the various timing signals generated by the circuitry of the invention.

According to an important feature of the invention, the gate clock signal 50 has a frequency which is proportional to the temperature level sensed by the temperature transducer 34. The gating generator portion of the counter 52 generates a series of successive enabling pulses as shown in FIG. 3 with the duration of the enabling pulses preferably being substantially equal to the clock cycle period of the clock signal 50. These enabling pulses are applied to the input of the parallel-to-serial data converter 30 so that the data bits of the calibrated parallel data signals 28 are gated into the serial shift register 48 at a rate which is proportional to the temperature sensed by the transducer 34. According to this arrangement, the temperature information is integrated into the pressure data word, and because the pressure data bits are gated at a rate proportional to temperature, the length of the pressure data word is inversely proportional to the level of temperature sensed by the transducer 34. This relationship is used to derive temperature data from the generation of the pressure data word.

In operation, the parallel-to-serial data converter 30 produces a serial data signal 54 which is applied to the input of the serial shift register 48. As the last data bit $Q_o$ is enabled, a differentiating network comprising a capacitor 56 and resistor 58 triggers the binary register 60 to conduct a reset signal 62 to the pressure program generator 26. In response to the reset signal 62, the pressure program generator 26 applies the reset signal 46 to the counter and gate generator circuit 52 and is coupled to an inverter 68 for producing reset signal 69 which produces an enabling signal 74 for an AND-gate 72. The AND-gate 72 conducts the complement clock signal $\overline{CLK}$ to the pressure shift register 48.

As soon as the most significant bit $Q_n$ sampling pulse is generated by the gate generator 52, the reset signal 62 is produced by the edge triggered binary register 60. The most significant bit sampling pulse is differentiated by the network comprising the capacitor 56 and resistor 58, with a rising edge of the differentiated sampling pulse setting the non-inverting output Q to logic "zero" and the complementary output $\overline{Q}$ to logic "one." At this instant of time, the storage of the pressure data word into the shift register 48 is completed and the pressure program generator 26 is reset to its original state until the data word interval strobe signal 64 sets the edge triggered binary register 60. With this strobe signal, the non-inverting output Q of the edge triggered binary register 60 produces a logic "one" enabling signal 76 which enables the pressure shift register 48, and the complementary output Q of the edge triggered binary register 60 becomes logic "zero" and removes the reset signal 62 from the pressure program generator 26.

The data bits conducted by the calibration data conductors 28 are gated into the pressure shift register 48 through the parallel-to-serial converter 30 by means of the gating generator 52 at a rate which is proportional to the frequency of the timing signal 36 produced by the oscillator 32. Therefore, temperature information may be extracted from each pressure data word. The temperature information is extracted by means of control circuitry which includes binary registers 78, 80.

Initially, the edge triggered binary registers 78, 80 are reset by a signal 82 generated by a turn-on reset circuit (TOR) 83 and applied to the reset input of the binary registers 78, 80 through an OR-gate 84. Under the reset condition, the non-inverting data output Q of each binary register 78, 80 is set to logic "zero" state. At the first positive transition of the complement of the reset signal 62, the non-inverting output Q of the edge triggered binary register 80 becomes logic "one" and enables the AND-gate 86. The temperature program generator 66 cooperates with this circuitry by generating two fixed frequency clock signals 88, 90 having a fixed frequency $F_T$ and $F_{TS}$, respectively. The frequency $F_T$ of the fixed frequency clock signal 88 is preferably much greater than the frequency of the temperature clock timing signal 36. The fixed frequency clock signal 88 is applied to the clock input of an N-cycle counter 92 through the AND-gate 86 upon the occurrence of an enabling signal 94 produced by the non-inverting output Q of the binary register 80.

The N-cycle counter 92 counts up to a predetermined number "N" and generates a pulse 96 through a decoding network 98. The pulse 96 is coupled to the OR-gate 84 to reset both of the binary registers 78, 80 and also resets the N-cycle counter. The number N is a positive integer which is proportional to the range of the second environmental condition being measured and which is preferably substantially larger than the number of data bits in the pressure data word.

At the first positive transition of the reset signal 46 generated by the pressure program generator 26, which signifies the end of a pressure data word, the non-inverting output Q of the binary register 78 becomes "one" and enables an AND-gate 100. In return, the AND-gate 100 transmits the fixed frequency clock signal 88 to the clock input of a temperature data counter 102. The temperature data counter 102 continues counting the fixed frequency clock signal pulses until the AND-gate 100 is disabled in response to the reset pulse 82 which is generated by the N-cycle counter 92. As soon as the reset pulse 82 terminates, a gate generating circuit 104 starts counting and generating a sequence of enabling pulses or signals 103 similar to the operation of the gate generator 52 for controlling the operation of a second parallel-to-serial converter 106. Also, the reset pulse 82 sets an edge triggered binary register 108 which produces a logic "one" state at its non-inverting output Q which causes it to enable the input of a temperature data shift register 110 and permits the parallel temperature information conducted through data conductors 112 to be shifted serially through a data conductor 113 into the shift register 110.

According to an important feature of the invention, as soon as the temperature data counter 102 generates the tenth data bit which is after the last temperature data bit is loaded into the shift register 110, the shift register 110 is disabled and the temperature data counter 102 is reset through a differentiating network comprising a capacitor 114 and a resistor 116. In order to ensure proper loading of the shift register 110, only nine clock pulses are applied. Therefore, beginning with the instant at which sampling enable pulses are produced by the gate generator 104, the temperature information which is available at the output of the temperature data counter 102 is sequentially gated into the shift register 110 bit-by-bit in synchronism with the fixed frequency clock signal 90 produced by the temperature program generator 66.

Both of the fixed frequency clock signals 88 and 90 are produced by a stable oscillator 118 connected to the clock input of the temperature program generator 66. The fixed frequency clock signal $F_T$ is used to extract temperature information from the pressure data word and the fixed frequency clock signal $F_{TS}$ is used to convert parallel temperature information into series form and to load this information into the serial temperature shift register 110.

Figure 6:
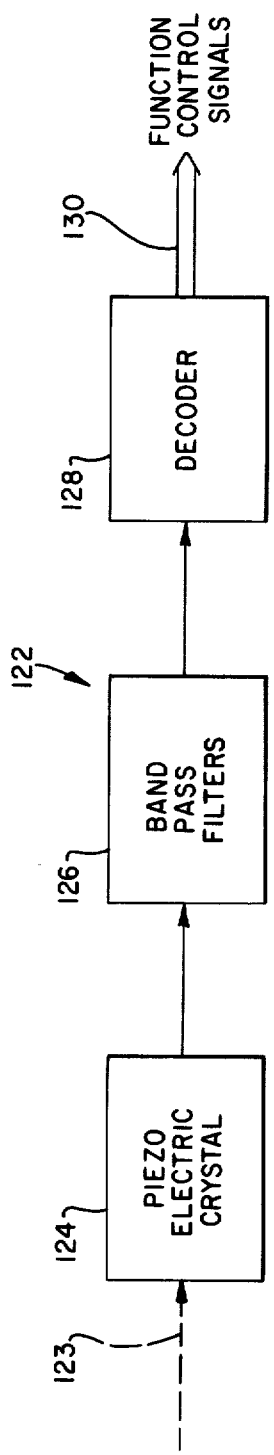
FIG. 6 is a block diagram of an acoustic receiver for selectively actuating the measuring and recording apparatus; and, FIG. 7 is a sectional view of a down hole gauge which includes the environmental condition measuring and recording apparatus of the invention.

The temperature program generator 66 also generates the pre-programmed data word interval strobe pulse 64 which is used to initiate the data acquisition process. The program generator 66 is actuated by means of program control switches 120 which preferably comprise reed-type switches which may be externally activated by a magnet in order to select one of several data word interval strobe functions. The temperature program generator 66 also contains an acoustic receiver circuit 122 as shown in FIG. 6. An acoustic signal 123 is received by a piezo electric crystal 124 and is amplified by an active band pass filter 126. The message contained in the signal 123 is decoded by decoding circuitry 128. The output of the decoding circuit 128 is applied directly to the temperature program generator 66 as shown in FIG. 2. The acoustic receiver 122 controls power turn-on and selection of a functional program. However, the acoustic receiver does not shut off the power to the data shift registers 48, 110 at any time since they are volatile memory storage devices which must remain energized in order to preserve the data stored therein. The acoustic receiver 122 receives a coded acoustic signal which may be transmitted from above ground through the pipe system of an oil well down to the apparatus in the bore hole. The decoder 128 generates a plurality of function control signals 130 which control the initiation and selection of functional programs within the temperature program generator 66.

The removal and correction of temperature and pressure anomalies is shown in FIG. 4 of the drawing. The pressure program generator 26 produces the temperature calibration clock signal 38 having a frequency which is a function of the temperature sensed by the temperature transducer 34. These temperature sensitive clock pulses are counted by the temperature counter 40 and include a decoder (not shown) which produces a coded temperature data calibration signal having a plurality of data bits defining a digital data temperature calibration word which corresponds in compensating relation with the value of the temperature anomaly which is to be corrected. The pressure anomaly associated with the pressure transducer 12 is corrected by means of calibration data stored in the read only memory 42.

It has been demonstrated that the four least significant bits usually carry the pressure anomalies of the pressure transducer. Therefore, these four least significant bits are applied to the input of the read only memory 42 for pressure anomaly compensation. The calibration data bits are permanently stored in memory locations within the read only memory 42 which logically correspond to the address defined by the uncalibrated data bits. Therefore, the output of the read only memory 42 contains the correct information and is applied to the input of a first four bit adder 134 which logically adds the pressure corrected data to the temperature corrected data. The compensated outputs of the read only memory 42 and the temperature counter 40 are added to each other with the carry-out bit being applied to successive four bit adders 136, 138 so that word receives a temperature correction. It will be appreciated by those skilled in the art that correction circuits and arrangements other than that shown in FIG. 4 may be used to good advantage.

Figure 7:
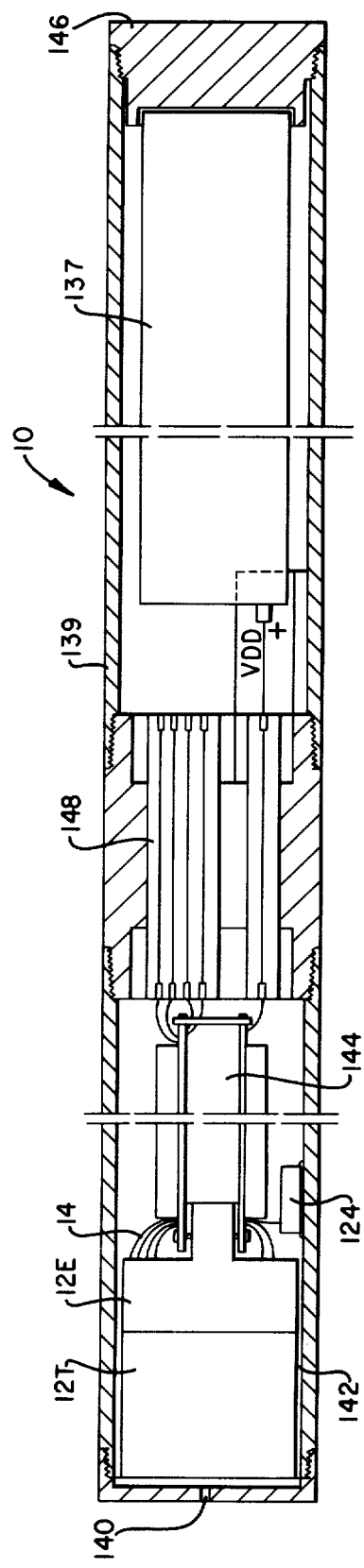

Referring now to FIG. 7, the physical layout of the measuring and recording apparatus 10 is illustrated. The measuring and recording apparatus 10 is energized by a DC storage battery 137 which is enclosed within a housing 139. Pressure is sensed through a pressure port 140 to the pressure transducer 12T which is located in a pressure chamber 142. The motion of the pressure transducer is transferred by means of a shaft to the encoding system 12E. The encoder 12E is conducted to the comparators 16 which are mounted on printed circuit boards 144. The piezo electric crystal 124 is cemented to the housing 139. The housing 139 forms the power return for the system. When the instrument is retrieved, the housing 139 is removed to provide access to the battery and also to provide access to the output end of a five-terminal feed through connector 148. A surface recorder (not shown) may be attached to the feed through connector 148 and the information contained in the serial shift registers 48, 110 can be circulated out by applying a clock signal 150 and circulation enable signal 152 to the common clock and enable inputs of the shift registers 48, 110.

The batteries 137 which supply power to the system are preferably designed to operate at very high temperatures. It is preferred that complementary metal oxide semiconductor (CMOS) integrated circuits are utilized in order to conserve power.

In summary, the environmental condition measuring and recording apparatus 10 is situated down hole in an oil well or the like for measuring and recording pressure and temperature conditions. A Bourdon tube is provided for sensing the level of pressure and an optical encoder is coupled to the Bourdon tube for digitizing the pressure information. The output of the optical encoder is transformed into precise digital state by comparators. A digital logic circuit, referred to as the pressure program generator, is controlled by a temperature responsive oscillator and generates the necessary clock pulses and other functional pulses in order to control calibration circuitry for temperature and pressure anomaly correction and to control a parallel-to-serial to serial converter so that the parallel pressure data information can be transformed into serial form for loading into a serial shift register. According to an important feature of this circuitry, a clock signal generator and a counting circuit are provided for sequentially gating the data bits of the pressure data word into the serial shift register at a rate which is proportional to the frequency of the temperature dependent timing signal, so that temperature information is carried by each pressure data word. This temperature information is extracted from each data word by means of a clock signal generator which generates clock pulses at a fixed frequency and a counting circuit which is coupled to the clock signal generator for producing a plurality of bits representative of its count during a counting interval. The counting circuit is enabled simultaneously with the gating of a last data bit of the pressure data word, and is disabled in response to the generation of a predetermined number of clock pulses during a counting interval which begins with the gating of the first data bit of the pressure data word, and which terminates in response to the completion of the predetermined clock pulse count. Therefore, when the temperature is relatively low, the length of the pressure data word will be relatively long, and the counting circuit will have a relatively low count. When the temperature is relatively high, the length of the pressure data word will be relatively short, and the counting circuit will have a relatively high count. This inverse relationship between the length of the pressure data word and the number of pulses counted by the temperature counting circuit is illustrated in FIG. 3 of the drawing. The fixed frequency oscillator in cooperation with the temperature program generator generates the necessary clock pulses and other functional signals to operate the temperature counting circuit, the temperature data enabling circuit, the parallel-to-serial data converter, and the serial data shift registers. Because the data is stored serially in the shift registers, the complexity of the logic circuitry is minimized, since no address registers are required, in contrast with the requirements of random access memory arrangements of conventional measurement and recording systems.

Although a preferred embodiment of the invention has been described in detail, it should be understood the various changes, substitutions, and alterations can be made therein without departing from the spirit and scope of the invention as defined by the appended claims.

What is claimed is:

1. Apparatus for measuring and recording environmental conditions comprising, in combination:

means for sensing a first environmental condition, including encoder means for providing a plurality of data bits defining a coded word, each bit of the coded word having at least two distinct code states, the premutation sequence of the code states of the bits in the word being representative of the first environmental condition sensed;

means for sensing a second environmental condition, including means for providing a timing signal having a frequency indicative of the level of the second environmental condition sensed;

a clock signal generator for generating clock pulses at a fixed frequency;

a counting circuit coupled to the clock signal generator for producing a plurality of data bits representative of its count during a counting interval, data storage means for recording data bits in separate groups of bits defining data words which are representative of the first and second environmental conditions, respectively; and, control circuitry logically coupled to the first and second environmental condition sensing means, clock signal generator, counting circuit and data storage means for sequentially gating the first environmental condition data bits into the data storage means at a rate which is proportional to the frequency of the timing signal, for enabling the counting circuit simultaneously with the gating of the last data bit of the first environmental condition data word, for disabling the counting circuit in response to the generation by the clock signal generator of a predetermined number of clock pulses during a counting interval beginning with the gating of the first data bit of the first environmental condition word and terminating in response to the completion of said predetermined clock pulse count, and for gating the plurality of data bits representative of the number of clock pulses counted by the counting circuit during said counting interval into the data storage means in response to the occurrence of said predetermined count.

2. The environmental condition measuring and recording apparatus as defined in claim 1, wherein the first environmental condition is pressure, and the second environmental condition is temperature.

3. The environmental condition measuring and recording apparatus as defined in claim 2, wherein the means for sensing the first environmental condition comprises a Bourdon tube.

4. The environmental condition measuring and recording apparatus as defined in claim 2, wherein the means for providing a timing signal comprises a temperature responsive oscillator.

5. The environmental condition measuring and recording apparatus as defined in claim 1, wherein the data storage means comprises a serial shift register, and wherein the control circuitry comprises a parallel-to-serial data converter operably connected intermediate the first environmental sensing means and the serial shift register for sequentially conducting data bits into the shift register in response to successive enabling pulses, and gating generator means coupled intermediate the timing signal means and data converter for generating a series of successive enabling pulses.

6. The environmental condition measuring and recording apparatus as defined in claim 5, wherein the duration of each enabling pulse is substantially equal to the period of the timing signal.

7. The environmental condition measuring and recording apparatus as defined in claim 1, wherein the fixed frequency of the clock signal generator is substantially greater than the frequency of the timing signal throughout the range of values of the second environmental condition.

8. The environmental condition measuring and recording apparatus as defined in claim 1, wherein the predetermined number of clock pulses produced by the clock signal generator is N, N being a positive integer which is proportional to the range of the second environmental condition being measured.

9. The environmental condition measuring and recording apparatus as defined in claim 1, the first environmental condition sensing means being characterized by two anomalies, one of which is a predictable function of its physical parameter responsive to the first environmental condition, and the other one is due to the second environmental condition to which it is exposed, the combination further including:

non-volatile digital data storage means having an array of memory cells for recording calibration data bits for the data and for offsetting the effects of the reproducible anomaly, the calibration data bits being permanently stored in a memory location which corresponds to a selected plurality of bits of the environmental condition data word produced by the encoder means, the non-volatile digital data storage means having an input circuit coupled to the encoder means for receiving the selected plurality of data bits of the uncalibrated word and having an output circuit for conducting a corresponding number of calibration data bits which logically correspond to the address defined by the uncalibrated data bits.

10. The environmental condition measuring and recording apparatus as defined in claim 9, wherein the first environmental condition sensing means includes a transducer which is characterized by an anomaly which is a predictable function of the second environmental condition, the combination further including:

calibration function generating means for generating a plurality of data bits defining a digital data calibration word which corresponds in compensating relation with the value of the second environmental condition anomaly; and, an adder logic unit for logically adding the digitally calibrated data bits of the first environmental condition which are stored in the non-volatile digital data storage means to the compensating digital data bits of the second environmental condition data word, the adder logic unit having a first plurality of digital input circuits coupled to the encoder means for receiving calibrated data bits for the first environmental condition, a second plurality of digital input circuits coupled to the calibration function generating means for receiving the digital data bits which define the calibration word for the second environmental condition, and a plurality of digital output circuits for conducting the calibrated first environmental condition data bits which are the logical sums of the calibrated first environmental condition data bits and the corresponding second environmental condition compensating data bits.

11. The environmental condition measuring and recording apparatus as defined in claim 1, wherein the first environmental condition sensing means is characterized by an anomaly which is a predictable function of the first environmental condition, the combination further including:

non-volatile digital data storage means having an array of memory cells for recording calibration data bits for the data and for offsetting the effects of the reproducible anomaly, the calibration data bits being permanently stored in a memory location which corresponds to a selected plurality of bits of the environmental condition data word produced by the encoder means, the non-volatile digital data storage means having an input circuit coupled to the encoder means for receiving the selected plurality of data bits of the uncalibrated word and having an output circuit for conducting a corresponding number of calibration data bits which logically correspond to the address defined by the uncalibrated data bits.

12. The environmental condition measuring and recording apparatus as defined in claim 1, wherein the first environmental condition sensing means is characterized by an anomaly which is a predictable function of the second environmental condition, the combination further including:

calibration function generating means for generating a plurality of data bits defining a digital data calibration word which corresponds in compensating relation with the value of the second environmental condition anomaly; and, an adder logic unit for logically adding the digital data calibration word to the uncalibrated first environmental condition data word, the adder logic unit having a first plurality of digital input circuits coupled to the encoder means for receiving uncalibrated data bits, a second plurality of digital input circuits coupled to the calibration function generating means for receiving the digital data bits which define the calibration word, and a plurality of digital output circuits for conducting the calibrated first environmental condition data bits which are the logical sums of the uncalibrated first environmental condition data bits and the corresponding second environmental condition calibration data bits.

13. Apparatus for measuring and recording environmental conditions comprising, in combination:

means for sensing a first environmental condition, including encoder means for providing a plurality of data bits defining a coded word, each bit of the coded word having at least two distinct code states, the permutation sequence of the code states in the word being representative of the first environmental condition sensed;

means for sensing a second environmental condition, including means for providing a timing signal having a frequency indicative of the second environmental condition sensed;

a first serial data storage unit coupled to the first environmental condition sensing means for recording the coded word;

first control circuitry logically coupled to the first and second environmental condition sensing means for sequentially gating the first environmental condition data bits into the first serial data storage unit at a rate which is proportional to the frequency of the timing signal;

a second serial data storage unit;

a clock signal generator for generating a clock output signal having a frequency substantially greater than the frequency of the timing signal;

a counting circuit coupled to the clock signal generator for generating a plurality of data bits representative of its count during a counting cycle; and, second control circuitry logically coupled to the first control circuitry, counting circuit and second serial data storage unit for enabling the counting circuit simultaneously with the gating of the last data bit of the first environmental condition data word, for disabling the counting circuit in response to a predetermined clock cycle count, and for sequentially gating the plurality of data bits representative of its count into the second serial data storage unit in response to the occurrence of said predetermined count.

14. Apparatus for use in deep boreholes in the earth for sensing, digitizing and storing values of downhole pressure and temperature conditions comprising, in combination:

a pressure transducer;

an encoder coupled to the pressure transducer for producing a digital data pressure word having a plurality of data bits representative of the pressure level sensed by the pressure transducer;

a temperature transducer;

a first oscillator coupled to the temperature transducer for producing a first clock signal having a frequency which is proportional to the temperature level sensed by the temperature transducer;

a first gating generator coupled to the first oscillator for generating a series of successive enabling pulses, the duration of each enabling pulse being substantially equal to the clock cycle period of the first clock signal;

a first parallel-to-serial data converter having a first input circuit coupled to the encoder to receive the digital data pressure word and having a second input circuit coupled to the first gate generator for receiving the successive enabling pulses, and having an output circuit for conducting the pressure word data bits serially during the successive gate intervals;

a first serial data storage unit coupled to the output circuit of the parallel-to-serial data converter for receiving and storing the pressure word data bits as they are sequentially gated by the first counting circuit;

a second oscillator for generating a second clock signal having a frequency which is substantially greater than the frequency of the first clock signal;

an N-cycle counter coupled to the second oscillator for generating a reset pulse in response to a count of N clock cycles, N being a positive integer;

a temperature data counting circuit coupled to the second oscillator for generating a temperature data word having a plurality of data bits representative of its count during a temperature data counting cycle;

a second gating generator for generating a series of successive enabling pulses;

a second parallel-to-serial data converter having a first input circuit coupled to the temperature data counting circuit for receiving the temperature data bits, a second input circuit coupled to the second gate generator for receiving the successive enabling pulses, and having an output circuit for conducting the temperature data word bits serially during the successive gating intervals;

a second serial data storage unit coupled to the output circuit of the second data converter for receiving and storing the temperature data word bits as they are sequentially gated by the second gating generator; and, control circuitry logically interconnecting the first and second gating generators, N-cycle counter, temperature data counting circuit, and first and second serial data storage units for enabling the N-cycle counter simultaneously with the gating of the first data bit of the pressure word, enabling the temperature data counting circuit simultaneously with the gating of the last data bit of the pressure word, disabling the temperature data counting circuit in response to the reset pulse produced by the N-cycle counter, and enabling the first and second serial data storage units for loading the pressure and temperature data words, respectively, in response to the reset pulse produced by the N-cycle counter.

15. A method for measuring and recording environmental conditions using sensors and data processing elements comprising the steps:

sensing a first environmental condition with a sensor;

generating a plurality of data bits defining a coded word, each bit of the coded word having at least two distinct code states, the permutation sequence code states of the bits in the word being representative of the first environmental condition sensed;

sensing a second environmental condition in a bore hole with a sensor, generating a timing signal having a frequency indicative of the level of the second environmental condition sensed;

sequentially gating the first environmental condition data bits into a data storage unit at a rate which is proportional to the frequency of the timing signal;

generating clock pulses at a fixed frequency;

counting the number of fixed frequency clock pulses which occur in the interval beginning with the gating of the last data bit of the first environmental condition data word and terminating with the completion of a predetermined number of fixed frequency clock pulses occurring after the gating of the first data bit of the first environmental condition word, generating a plurality of data bits defining a coded word corresponding to the fixed frequency pulse count, each bit of the coded word having at least two distinct code states, the permutation sequence of the code states of the bits being representative of the number of fixed frequency clock pulses counted during the counting interval and being representative of the level of the second environmental condition sensed; and, gating the plurality of data bits representative of the fixed frequency clock pulse count into a data storage unit.

16. The method for measuring and recording environmental conditions as defined in claim 15, wherein the clock pulses are generated at a fixed frequency which is substantially greater than the frequency of the timing signal throughout the range of values of the second environmental condition sensed.

17. The method of measuring and recording environmental conditions as defined in claim 15, wherein the predetermined number of fixed frequency clock pulses occurring after the gating of the first data bit of the first environmental data word is equal to N, N being a positive integer which is substantially greater than the number of data bits defining a first environmental condition data word.

18. The method for measuring the recording environmental conditions as defined in claim 15, wherein the data bits of the first environmental condition word are generated in parallel data format, the data bits being sequentially gated in serial data format into the storage unit during successive enabling intervals, the duration of each successive enabling interval being substantially equal to the period of the second environmental condition timing signal.

19. The method for measuring and recording environmental conditions as defined in claim 15, wherein the first environmental condition sensor is characterized by a parametric anomaly which is a predictable function of the first environmental condition, the method further including the step:

compensating a selected plurality of data bits of the first environmental condition data word with pre-recorded calibration data bits to offset the effect of the anomaly prior to recording the data bits of the first environmental condition word in the data storage unit.

20. The method for measuring and recording environmental conditions as defined in claim 15, wherein the plurality of data bits representative of the first environmental condition data word are generated by a transducer and encoder combination which is characterized by an anomaly which is a predictable function of the second environmental condition, the method further includng the steps:

generating a plurality of data bits defining a digital data calibration word which corresponds in compensating relation with the value of the anomaly for the level of the second environmental condition sensed; and, logically adding the digital data calibration bits to the corresponding uncalibrated first environmental condition data bits to offset the effect of the anomaly prior to recording the bits in the data storage unit.

* * * * *